3,773,960
ACARACIDAL COMPOSITIONS AND METHODS COMPRISING ALIPHATICALLY SUBSTITUTED THIOSULFINYL- AND SULFONYL-ALKYL-2,4,5-TRIHALOGENO IMIDAZOLES
Hans Rutz, Basel, and Kurt Gubler, Riehen, Switzerland, assignors to Ciba-Geigy Corporation, Ardsley, N.Y.
No Drawing. Original application Apr. 24, 1968, Ser. No. 723,904, now Patent No. 3,625,955. Divided and this application Apr. 5, 1971, Ser. No. 131,447
Claims priority, application Switzerland, Apr. 26, 1967, 5,960/67
Int. Cl. A01n 9/22
U.S. Cl. 424—273     8 Claims

ABSTRACT OF THE DISCLOSURE 2,4,5-trihalogeno-imidazoles substituted in 1- position at the imidazole nucleus by a group of the formula R—S—A—, R—SO—A— or R—SO$_2$—A— in which group R represents an optionally substituted aliphatic hydrocarbon radical and A represents an alkylene group, are described, which imidazoles are acaricidally active and at the same time well tolerated by cultivated plants; they are thus useful for the control of acarinae, and especially of spider mites, on cultivated plants and trees. Acaricidal compositions containing such novel imidazoles as active ingredients, and a method of controlling acarinae with the aid of such compounds are also disclosed.

CROSS-REFERENCE TO RELATED APPLICATION

This is a division of application Ser. No. 723,904, filed Apr. 24, 1968, now U.S. Pat. No. 3,625,955.

DETAILED DISCLOSURE

The present invention concerns new aliphatically substituted thiosulfinyl- and sulfonyl - alkyl - 2,4,5-trihalogeno-imidazoles, processes for the production thereof, also acaricidal compositions which contain these new imidazoles as active substances, and in addition, processes for the production of these compositions and processes for combatting acarinae, especially of the kind infesting plants, with the aid of the new active substances.

N-substituted trihalogen imidazoles with herbicidal, insecticidal and acaricidal activity are known from the literature.

The new imidazole derivatives according to the invention having surprisingly superior acaricidal properties are of the general formula

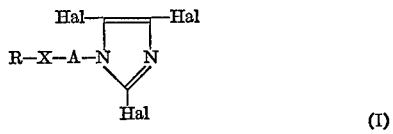

(I)

wherein

R represents an unsubstituted or substituted aliphatic hydrocarbon radical,
X represents sulphur or the sulphinyl or sulphonyl radical,
A represents an alkylene radical, and
Hal represents a halogen atom having an atomic number of at most 35.

The new imidazole derivatives of the general Formula I are obtained according to the invention by reacting according to procedure (a) A trihalogen imidazole of the general Formula II

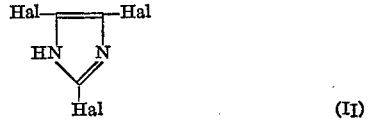

(II)

with an ether of the general Formula III

R—S—A—Hal     (III)

in which formulae Hal, R and A have the meanings given in Formula I, in the presence of an acid binding agent; or by reacting according to procedure (b) a trihalogen imidazole of the general Formula IV

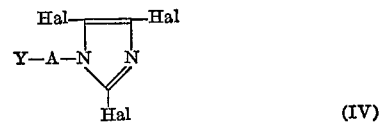

(IV)

with a compound of the general Formula V

R—Z     (V)

in which formulae

Y and Z, with the exception of an S atom contained in either Y or Z, represent radicals which are split off in the reaction, and
Hal, R and A have the meanings given in Formula I, optionally in the presence of an acid binding agent;

and, if desired, oxidizing the end products of the general Formula I, wherein X represents sulphur, to the corresponding sulphinyl or sulphonyl derivatives.

In the imidazole derivatives of general Formula I, R, as aliphatic hydrocarbon radical can represent e.g. an alkyl radical having 1 to 16 carbon atoms, preferably however, a lower alkyl radical such as the methyl, ethyl, propyl, butyl or pentyl radicals, etc., also it can represent a lower alkenyl radical such as the allyl, crotyl or methallyl radical, or a lower alkinyl radical such as the propinyl or 1-methyl-2-propinyl radical. These hydrocarbon radicals can be mono- or polysubstituted, e.g. by halogen, lower alkoxy, lower alkylthio or cyano groups. The chain of the alkylene radical A can be straight or branched and has, preferably, 1 or 2 carbon atoms as chain members. Preferred halogen atoms Hal are chlorine and, particularly, bromine.

"Lower" used in connection with an aliphatic radical means that the latter has at most 4 carbon atoms.

As acid binding agents in the process according to procedures (a) and (b) of the invention, preferably inorganic bases such as hydroxides and oxides of alkali and alkaline earth metals, e.g. potassium or sodium hydroxide, as well as alcoholates of low alkanols with alkali metals such as sodium and potassium methylate, ethylate, propylate, isopropylate, butylate, particularly potassium tert. butylate, or mixtures of hydroxides and alcoholates are used. It is of advantage to perform the process according to procedures (a) and (b) in the presence of solvents or diluents which are inert to the reaction partners, i.e. hydrocarbons, halogenated hydrocarbons, amides such as dialkyl carboxylic acid amides, ethers and ether-type compounds, and also alcohols in the case of procedure (b).

In the process according to procedure (a) of the invention, advantageously the trihalogen imidazole of the general Formula II is converted with one of the strong inorganic bases mentioned above into the corresponding imidazole salt. Because of its sensitivity to air, this is preferably reacted in an inert gas atmosphere, e.g. under nitrogen, with an ether of general Formula III.

Of the symbols Y and Z in general Formulae IV and V, one represents the mercapto group and the other a halogen atom, or one represents the group S-Me wherein Me is a metal atom and the other represents a halogen atom.

The oxidation of imidazole derivatives of the general Formula I, wherein X represents sulphur, to the corresponding sulphinyl or sulphonyl derivatives can be carried out with oxidising agents such as hydrogen peroxide, organic peracids or potassium permanganate.

Some of the starting materials embraced by the general Formulae II and IV are known and some are new. 2,4,5-trichloroimidazole falling under the general Formula II can be prepared by reacting 2,4,5-tribromoimidazole with HCl. The compound falling under the general Formula IV in which e.g. Hal in 2-position is chlorine, and in 4- and 5-position is bromine, and in which Y—A— represents chloromethyl, can be prepared by reacting the hydroxymethyl-tribromo derivative with thionyl chloride in dimethyl formamide.

Some of the new imidazole derivatives are crystalline, others are oils. The new compounds are stable and dissolve well in the usual organic solvents. They are only slightly toxic to warm blooded animals.

The new imidazole derivatives of general Formula I have acaricidal and insecticidal properties, especially very good acaricidal activity and are excellently suitable as acaricides in plant protection due to their non-phytotoxic properties for the control of acarinae and their stages of development.

The new active substances are suitable, e.g. for combatting normally sensitive and resistant mites of the species Mesostigmata, Trombidiformes and Sarcoptiformes. For example, in the case of Tetranychidae, not only the mobile stages (larvae, protonymphs, deutonymphs and adults) but also the dormant stages and eggs are killed within a short time. On using 1-methylthiomethyl-2,4,5-tribromo-imidazole in a concentration of 0.05%, all stages, both mobile and dormant, of normally sensitive spider mites and of those which are resistant to phosphoric acid esters and benzylic acid esters are killed completely within 1 day.

Fruit trees treated with active substances of the general Formula I showed no phytotoxic effects after treatment, e.g. by spraying to run-off, with a suspension containing 0.5 g. of active substance per liter.

The imidazole derivatives of general Formula I are applied in the form of solid or liquid compositions as dusts, sprinkling agents, granulates and aqueous dispersions which are obtained from wettable powders, pastes and emulsion concentrates. They are also applied as solutions or aerosols.

The compositions according to the invention are produced in the known way by intimately mixing and milling the active substance with suitable agriculturally acceptable plant-tolerated carriers, optionally with the addition of dispersing agents or solvents which are inert to the active substances and well-tolerated by cultivated plants in the amounts applied to the latter in the field. The concenration of active substance in these compositions is, e.g. 0.01–80%, preferably 10–80%, calculated on the total weight of the composition. The compositions according to the invention can be used together with other acaricidal, insecticidal, ovicidal, fungicidal, bactericidal compounds and/or with synergists or inactive additives. These concentrates can be diluted to give the desired concentrations for application.

The following non-limitative examples illustrate the invention further. Where not otherwise expressly stated, parts and percentages are given by weight; the temperatures are given in degrees centigrade; parts by weight relate to parts by volume as grams to milliliters.

Example 1

6 parts of potassium tert. butylate in 50 parts by volume of dimethyl formamide are added to a solution of 15.2 parts of 2,4,5-tribromo-imidazole in 50 parts by volume of dimethyl formamide. 5 parts of methylthiomethyl chloride in 50 parts by volume of dimethyl formamide are added dropwise at room temperature to the clear yellow solution while stirring and introducing nitrogen. On completion of the addition, the reaction mixture is further stirred overnight at room temperature whereupon potassium chloride precipitates and the mixture becomes dark coloured. The reaction mixture is diluted with 500 parts by volume of ether and extracted first with water and then with 2 N sodium carbonate solution. No tribromo-imidazole precipitates from the aqueous extract on acidifying. The ether phase is dried over sodium sulphate and concentrated in vacuo. The solid residue, 1 - methylthiomethyl - 2,4,5 - tribromoimidazole, is boiled in alcoholic solution with animal charcoal. The solution is filtered hot. On cooling, 1-methylthiomethyl - 2,4,5 - tribromo-imidazole precipitates from the filtrate in crystalline form, M.P. 97–98°.

Example 2

(a) 1058 parts of hydrogen chloride are introduced into a stirred solution of 890 parts of 2,4,5-tribromoimidazole in 2800 parts by volume of dimethyl formamide, the temperature being allowed to rise to 110° during the introduction. The reaction mixture is kept at 130° for 6 hours. On cooling to room temperature the solution solidifies, and the resulting slurry of crystals is charged into 15,000 parts of water. The solid product is filtered, washed with water and dried. Recrystallisation from 50% aqueous alcohol yields 2,4,5-trichloro-imidazole melting at 177–180° with decomposition.

(b) A solution of 4 parts of sodium hydroxide in 100 parts by volume of methanol is added to a solution of 17.1 parts of 2,4,5-trichloro-imidazole in 100 parts by volume of methanol and the resulting solution is evaporated at 40° under water pump vacuum. The solid residue is slurried twice with 100 parts by volume of anhydrous benzene and the solvent evaporated in vacuo in order to remove any water adhering thereto. The dry sodium salt of trichloro-imidazolo is suspended in 300 parts by volume of anhydrous benzene. A solution of 10 parts of methylthiomethyl chloride in 100 parts by volume of benzene is added dropwise to the suspension at room temperature while stirring and introducing nitrogen, whereupon a slightly exothermic reaction takes place and the sodium salt of the trichloro-imidazole dissolves and sodium chloride precipitates. The mixture is then stirred, first for 1 hour at room temperature, then for 1.5 hours at 60°. After cooling, the reaction mixture is extracted with water and then with 2 N sodium carbonate solution to remove side products. After drying over sodium sulphate, the benzene phase is concentrated in vacuo. The residue is recrystallised from alcohol and the pure 1-methylthiomethyl-2,4,5-trichloro-imidazole thus obtained has a melting point of 72–73°.

Example 3

(a) 180 parts of thionyl chloride are added dropwise to a stirred solution of 426 parts of 1-hydroxymethyl-2,4,5-tribromo-imidazole in 1200 parts by volume of dimethyl formamide at a temperature of 0°. The reaction mixture is stirred for 3 hours at room temperature and then for 1 hour at 100°, and, after recooling to room temperature, poured into 5000 parts of water. The precipitated solid product is filtered, washed with water and dried. After recrystallization from benzene 1-chloromethyl-4,5-dibromo-2-chloroimidazole is obtained, M.P. 86–87°.

(b) A solution of 5.6 parts of sodium thio-sec.butylate in 100 parts by volume of alcohol is added dropwise to a solution of 15.5 parts of 1-chloromethyl-4,5-dibromo-2-chloroimidazole in 100 parts by volume of anhydrous alcohol. The reaction mixture is allowed to stand overnight at room temperature. The solvent is then removed and the residue dissolved in ether/water. The ether phase is washed with water, dried over sodium sulphate and evaporated. 1 - sec.butylthiomethyl-4,5-dibromo-2-chloroimidazole is obtained in pure form from the oily residue by distillation; B.P. 113°/0.001 mm. Hg.

Example 4

A solution of 18.2 parts of 1-methylthiomethyl-2,4,5-tribromoimidazole and 5.7 parts by volume of 30% aqueous hydrogen peroxide in 50 parts by volume of glacial acetic acid is allowed to stand at room temperature for 3 days. Upon dilution of the reaction mixture with water, the product separates as an oil. The mixture is neutralised with 2 N NaOH and the product is extracted with chloroform. The chloroform phase is washed with water, dried, and the solvent is evaporated in vacuo. The oily residue crystallizes upon trituration with methanol. Recrystallization from methanol affords pure 1-methylsulphinylmethyl-2,4,5-tribromo-imidazole, M.P. 120–121°.

Example 5

A solution of 54.7 parts of 1-methylthiomethyl-2,4,5-tribromoimidazole and 80 parts by volume of 30% hydrogen peroxide in 150 parts by volume of glacial acetic acid is heated at 70° for 1 hour. The reaction mixture is diluted with water, neutralised with sodium hydroxide, and the product is extracted with chloroform. The chloroform phase is washed with water, dried, and the solvent is evaporated. The oily residue crystallises upon trituration with methanol. Recrystallisation from methanol and benzene affords pure 1-methylsulphonylmethyl-2,4,5-tribromoimidazole, M.P. 144–146°.

The new 2,4,5-trihaloimidazole derivatives of the general Formula I listed in the following table are obtained in the manner described in Examples 1 to 5.

TABLE I

| No. | Compounds | Physical constants |
|---|---|---|
| 1 | 1-ethylthiomethyl-2,4,5-tribromoimidazole. | B.P. 139–142°/0.002 mm. Hg. |
| 2 | 1-n-propylthiomethyl-2,4,5-tribromoimidazole. | B.P. 129–131°/0.001 mm. Hg. |
| 3 | 1-isopropylthiomethyl-2,4,5-tribromoimidazole. | B.P. 146–148°/0.02 mm. Hg. |
| 4 | 1-sec. butylthiomethyl-2,4,5-tribromoimidazole. | B.P. 133–135°/0.002 mm. Hg. |
| 5 | 1-isobutylthiomethyl-2,4,5-tribromoimidazole. | B.P. 133–135/0.01 mm. Hg. |
| 6 | 1-tert. butylthiomethyl-2,4,5-tribromoimidazole. | M.P. 74–76°. |
| 7 | 1-n-pentylthiomethyl-2,4,5-tribromoimidazole. | |
| 8 | 1-n-octylthiomethyl-2,4,5-tribromoimidazole. | |
| 9 | 1-n-dodecylthiomethyl-2,4,5-tribromoimidazole. | |
| 10 | 1-allylthiomethyl-2,4,5-tribromoimidazole. | |
| 11 | 1-(2-chloroethyl)-thiomethyl-2,4,5-tribromoimidazole. | |
| 12 | 1-(2-bromoethyl)-thiomethyl-2,4,5-tribromoimidazole. | |
| 13 | 1-(2-methyloxyethyl)-thiomethyl-2,4,5-tribromoimidazole. | |
| 14 | 1-(2-methylthioethyl)-thiomethyl-2,4,5-tribromoimidazole. | |
| 15 | 1-(2-cyanoethyl)-thiomethyl-2,4,5-tribromoimidazole. | |
| 16 | 1-isopropylsulphinylmethyl-2,4,5-tribromoimidazole. | M.P. 107–109°. |
| 17 | 1-ethylsulphonylmethyl-2,4,5-tribromoimidazole. | M.P. 97–99°. |
| 18 | 1-methylthiomethyl-4,5-dibromo-2-chloroimidazole. | M.P. 99–101°. |
| 19 | 1-ethylthiomethyl-4,5-dibromo-2-chloroimidazole. | B.P. 157–158°/0.01 mm. Hg. |
| 20 | 1-n-propylthiomethyl-4,5-dibromo-2-chloroimidazole. | $n_D^{20}$ 1.588. |
| 21 | 1-isopropylthiomethyl-4,5-dibromo-2-chloroimidazole. | B.P. 111°/0.001 mm. Hg. |
| 22 | 1-tert. butylthiomethyl-4,5-dibromo-2-chloroimidazole. | M.P. 63–65°. |
| 23 | 1-ethylthiomethyl-2,4,5-trichloroimidazole. | B.P. 94–96°/0.01 mm. Hg. |
| 24 | 1-n-propylthiomethyl-2,4,5-trichloroimidazole. | B.P. 106–108°/0.01 mm. Hg. |
| 25 | 1-isopropylthiomethyl-2,4,5-trichloroimidazole. | B.P. 127–128°/0.06 mm. Hg. |
| 26 | 1-n-butylthiomethyl-2,4,5-trichloroimidazole. | B.P. 115–117°/0.01 mm. Hg. |
| 27 | 1-tert. butylthiomethyl-2,4,5-trichloroimidazole. | B.P. 115–117°/0.01 mm. Hg. |

Wettable powder.—The following components are used to produce (a) a 50% and (b) a 10% wettable powder:

(a)

50 parts of 1-ethylthiomethyl-2,4,5-tribromo-imidazole,
5 parts of oleoylmethyl tauride sodium salt,
2.5 parts of disodium salt of dinaphthalene methane disulphonic acid,
25 parts of calcareous earth-clay silicates, and
17.5 parts of kaolin;

(b)

10 parts of 1-methylthiomethyl-2,4,5-tribromo-imidazole,
3 parts of a mixture of the sodium salts of saturated fatty alcohol sulphonates (fatty alcohols=$C_8$–$C_{18}$),
5 parts of disodium salt of dinaphthalene methane disulphonic acid, and
82 parts of kaolin.

The amounts of active substance mentioned are intimately mixed with the additives in suitable mixers and milled in corresponding mills and rollers. Wettable powders are obtained which can be diluted with water to form suspensions of any concentration desired. Such suspensions are used chiefly for combatting acarinae on stone and pome fruit trees, citrus fruits, ornamental plants and shrubs, vegetables, and berry bushes.

Emulsion concentrate.—The following components are mixed together to produce a 25% emulsion concentrate:

25 parts of 1-isopropylthiomethyl-2,4,5-tribromoimidazole,
10 parts of diacetone alcohol,
2 parts of iso-octyl-phenoxy-polyoxyethylene-ethanol,
3 parts of emulsifier consisting of a mixture of the Ca salt of dodecylbenzene sulphonic acid and nonylphenol polyoxyethylene (e.g. P 140 HFP, Union Chimique Belge S.A., Brussels), and
60 parts of xylene.

These concentrates can be diluted with water to form emulsions of any concentration desired. Such emulsions are used, e.g. to control *Tetranychus urticae*, *Metatetranychus ulmi* and *Beyobia pretiosa* (common spider mite, fruit tree spider mite and red gooseberry spider mite) on plum trees (Fellenberg, Basler Zwetschgen, Reineclauden, Bühler Zwetschgen and Mirabellen).

Paste.—The following substances are used to produce a 45% paste:

45 parts of 1-sec. butylthiomethyl-2,4,5-tribromo-imidazole,
5 parts of sodium aluminium silicate,
14 parts of cetylpolyglycol ether (condensation product with 8 mols of ethylene oxide),
1 part of oleyl polyglycol ether (condensation product of oleyl alcohol and 5 mols of ethylene oxide),
2 parts of spindle oil
10 parts of polyethylene glycol ether ("Carbowax"), and
23 parts of water.

The active substance is intimately mixed and milled with the additives in suitable apparatus. A paste is obtained from which, by dilution with water, suspensions of any concentration desired can be produced. Such suspensions are used, in particular, for controlling acarinae on cultivated plants and ornamentals and also on fruit trees.

Dust.—To produce a 10% dust, 10 parts of 1-methylthiomethyl-2,4,5-trichloroimidazole,
5 parts of highly dispersed silicic acid, and
85 parts of talcum are intimately mixed. Such a dust can be used, e.g. to control acarinae on vegetables, ornamental plants and shrubs, and berry bushes.

Test report.—In order to determine the acaricidal properties of the new compounds, a test was carried out with bean leaves infected with red spider mites (*Tetranychus urticae*) and all stages of their development. The bean leaves were treated with aqueous emulsions in concentrations of 0.1; 0.05, 0.01 and 0.005% of active substance until completely wet (prepared from a 25% emulsion concentrate). The concentrations of active substance used which led to 100% mortality after 6 days were determined.

Red spider mites which were normally sensitive and those resistant to benzylic acid esters and phosphoric acid esters were taken as test animals. The test results are given in the following table.

| Compounds | Concentration (in percent) of active substance leading to 100% mortality after 6 days | | |
|---|---|---|---|
| | Imagines/larvae | Quiescent stages | Eggs |
| 1-methylthiomethyl-2,4,5-tribromo-imidazole | 0.01 | 0.05 | 0.01 |
| 1-ethylthiomethyl-2,4,5-tribromo-imidazole | 0.005 | 0.005 | 0.01 |
| 1-methylsulphinylmethyl-2,4,5-tribromo-imidazole | 0.01 | 0.05 | 0.1 |
| 1-methylsulphonymethyl-2,4,5-tribromo-imidazole | 0.01 | 0.01 | 0.05 |
| 1-methyl-2,4,5-tribromoimidazole (known compound) | 0.05 | 0.05 | 0.05 |

We claim:
1. An acaricidal composition comprising (1) as the active ingredient an acaricidally effective amount of a compound of the formula

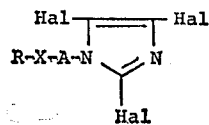

wherein
R represents alkyl of one to 16 carbon atoms; lower alkenyl; lower alkynyl; or lower alkyl substituted by a member selected from the group consisting of halogen, lower alkoxy, lower alkylthio and cyano;
X represents —S—,

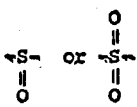

A represents alkylene of one or two carbon atoms; and Hal represents a halogen atom having an atomic number of at most 35,
and (2) an agriculturally acceptable carrier therefor.
2. The composition of claim 1 in which the compound is 1-methylthiomethyl-2,4,5-tribromoimidazole.
3. A method for controlling acarinae infesting cultivated plants, comprising applying to said plants an acaricidally effective amount of a compound of the formula

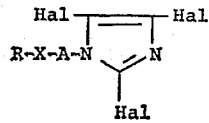

wherein
R represents alkyl of one to 16 carbon atoms; lower alkenyl; lower alkynyl; or lower alkyl substituted by a member selected from the group consisting of halogen, lower alkoxy, lower alkylthio and cyano;
X represents —S—,

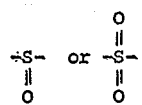

A represents alkylene of one or two carbon atoms; and Hal represents a halogen atom having an atomic number of at most 35.
4. A method according to claim 3 in which, in the compound, A represents —CH$_2$— and Hal represents bromine.
5. The method according to claim 4 in which the compound is 1-methylthiomethyl-2,4,5-tribromoimidazole.
6. The method according to claim 4 in which the compound is 1-ethylthiomethyl-2,4,5-tribromoimidazole.
7. The method according to claim 4 in which the compound is 1-methylsulfonylmethyl-2,4,5-tribromoimidazole.
8. The method according to claim 4 in which the compound is 1-methylsulfinylmethyl-2,4,5-tribromoimidazole.

References Cited
UNITED STATES PATENTS
| | | | |
|---|---|---|---|
| 3,423,420 | 1/1969 | Buchel et al. | 260—309 |
| 3,435,050 | 3/1969 | Wasco | 424—273 |
| 3,190,887 | 6/1965 | Hensley et al. | 424—273 |

FOREIGN PATENTS
| | | | |
|---|---|---|---|
| 6407401 | 1/1965 | Netherlands | 260—309 |
| 6510168 | 2/1966 | Netherlands | 260—309 |
| 6609596 | 1/1967 | Netherlands | 260—309 |

ALBERT T. MEYERS, Primary Examiner
N. A. DREZIN, Assistant Examiner

U.S. Cl. X.R.
424—358